J. G. McClamrock,
Cage Trap.
No. 78,306. Patented May 26, 1868.
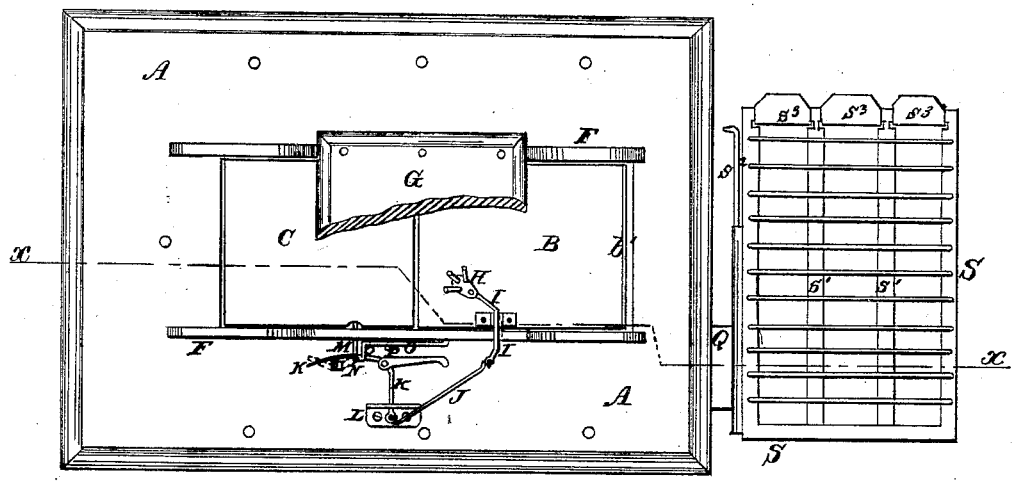
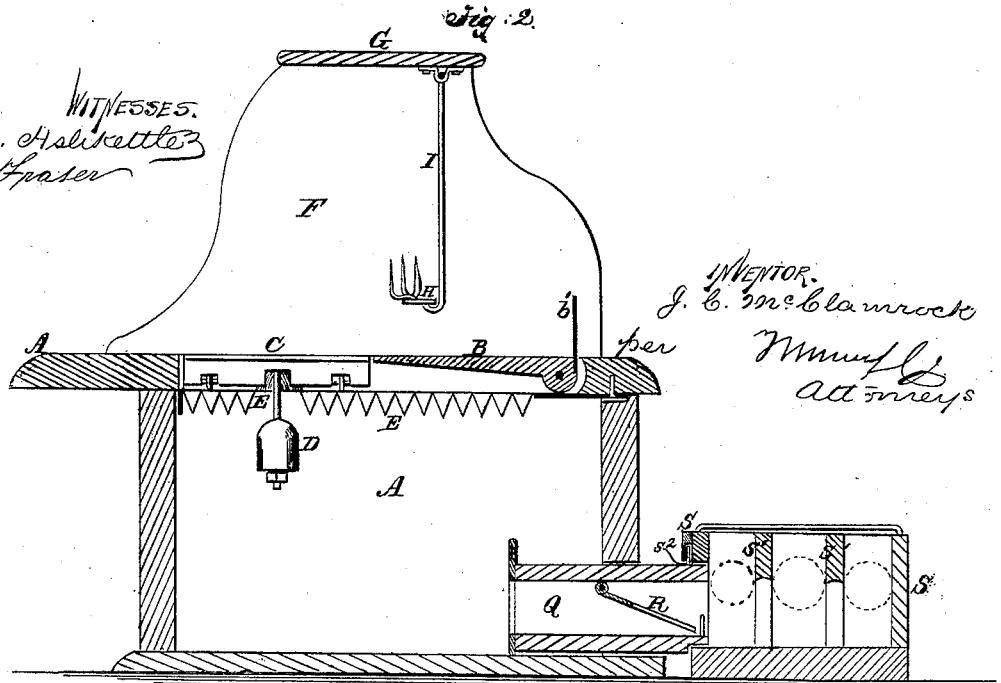

United States Patent Office.

JOHN C. McCLAMROCH, OF EDINA, MISSOURI.

*Letters Patent No. 78,306, dated May 26, 1868.*

---

IMPROVED ANIMAL-TRAP.

---

*The Schedule referred to in these Letters Patent and making part of the same.*

---

TO ALL WHOM IT MAY CONCERN:

Be it known that I, JOHN C. MCCLAMROCH, of Edina, in the county of Knox, and State of Missouri, have invented a new and improved Animal-Trap; and I do hereby declare that the following is a full, clear, and exact description thereof, which will enable others skilled in the art to make and use the same, reference being had to the accompanying drawings, forming part of this specification.

Figure 1 is a top or plan view of my improved trap, part being broken away to show the construction.

Figure 2 is a detail sectional view of the same, taken through the line $x\ x$, fig. 1.

Similar letters of reference indicate corresponding parts.

My invention has for its object to furnish an improved self-setting animal-trap which shall be simple in construction, durable, and reliable, which will require little attention, and with which any desired number of animals may be caught without the trap's being visited; and it consists in the construction and combination of the various parts, as hereinafter more fully described.

A is the box of the trap, which is made of any desired size, according to the size of the animal trapped for. The dimensions herein given may, therefore, be taken as proportional rather than actual dimensions. The box A is seven inches long, five and a half inches wide, and four and a quarter inches high, and has a rectangular opening, six inches long and two inches wide, formed in its top or upper side. The opening in the top of the box A is closed by two trap-doors, B and C, of equal size. The door B is hinged or pivoted, at its rear end, to the top of the box A, and has an upwardly-projecting plate or flange, $b'$, formed upon or attached to its pivoted end. The rear or pivoted end of the door B should be weighted, or made sufficiently heavy to hold the said door closed or in a horizontal position, except when an animal steps or jumps upon it. The other door, C, is pivoted at one side, as shown in fig. 2, and is closed or brought back to a horizontal position, after being opened or depressed, by an adjustable weight, D, suspended from its pivoted side.

The doors B and C are protected from being disturbed by animals from within the box A by a downwardly-projecting toothed plate, E, surrounding the opening in which said doors are pivoted.

To the top of the box A, at the sides of the opening for the trap-doors B and C, are attached vertical side-boards, F, the upper or top edges of which are connected by a top board, G. The side-boards F compel the animal to pass upon the doors B and C from the ends of the opening, and in the most favorable position for being precipitated into the box beneath.

H is the bait-hook, which is attached to the lower end of the inner arm of the U-shaped lever I, the horizontal part of which is pivoted to the top board G, or to the upper edge of one of the side-boards F, in such a position that the bait may be suspended over, or nearly over, the division-line between the two doors B and C. To the lower end of the other or outer arm of the lever I is pivoted the end of the connecting-rod J, the other end of which is pivoted to the end of one arm of the bent or bell-crank lever K.

The bent lever K is pivoted, at its angle, to a short post or support attached to the top of the box A, with its outer end projecting through and working in a V-shaped slot in the support or guide-plate L, attached to the top of the box A. The other arm of the bell-crank lever passes through a loop in the spring-catch M, so as to withdraw the said spring-catch from the door C upon the backward movement of the bait-hook. To produce the same effect upon the forward movement of the bait-hook, another bell-crank lever, N, may be pivoted to a support upon the other side of the spring-catch, with one of its arms passing through the loop of the spring-catch M, and with a loop or eye formed upon the end of its other arm, through which the free end of the bell-crank lever K passes, as shown in red in fig. 1.

The upper or elastic part of the spring-catch M extends up along the outer side of one of the side-boards F, and its upper end is pivoted to the end of the arm O, the other end of which is pivoted to the side of said side-board, and which is adjustably held in place by a button, P, so that the spring-catch M may be easily adjusted to the desired position.

At the top of the box A, an outwardly-projecting loop is formed, for the reception of the arms of the bell-crank lever or levers K N. The spring-catch M then passes through the side-board F, and passes down along the front edge of the door C, and has a shoulder or catch formed upon it, which receives the edge of said door, and supports it and the weight of the animal until the said spring-catch is withdrawn by the animal's moving the bait-hook lever. Then the said door falls, precipitating the animal into the box A.

The box A, when closed, is entirely dark, except the small amount of light that enters through the slotted gate R of the passage-way or tube Q.

The animal, seeking to escape, enters the passage-way Q, lifts the gate R, and passes out into the box S, which is removably attached to the outer end of said tube Q.

The box S may be of any desired size, and is divided into numerous compartments by partitions $s^1$, each compartment being of sufficient size to receive one of the animals.

To destroy or remove the animals, the box S is detached from the outer end of the tube Q, the ingress-opening being, at the same time, closed by the slide $s^2$. The animals may then be destroyed within the box S, or removed through the openings in the front of said box, said openings being closed by sliding gates $s^3$.

The top of the box S should be covered with slats or grating, as shown in fig. 1.

This trap may be constructed of wood, sheet metal, or other material, as may be convenient or desired.

I claim as new, and desire to secure by Letters Patent—

1. The described arrangement of the bait-hook H, U-shaped lever I, connecting-rod J, bell-crank levers K N, and adjustable spring-catch M, with relation to the pivoted trap-door C, all constructed and combined to operate in the manner and for the purpose substantially as set forth.

2. The detachable receptacle S, provided with partitions $s^1$ and slides $s^2$ $s^3$, and having a grated top, when said receptacle is adapted to be connected with the box A by means of the adjustable passage Q, in which the gate R is hinged, all constructed and arranged as and for the purpose set forth.

JOHN C. McCLAMROCH.

Witnesses:
 JOHN GRANT,
 JOSEPH A. BEACH.